United States Patent [19]

Amon et al.

[11] Patent Number: 5,259,568
[45] Date of Patent: Nov. 9, 1993

[54] COMMAND OPTICS

[75] Inventors: Max Amon, Maitland, Fla.; Andre E. Masson, Saint-Heand, France

[73] Assignee: Werkzeugmaschinenfabrik, Oerlikon-Buehrle AG Zurich, Switzerland

[21] Appl. No.: 571,581

[22] Filed: Jan. 17, 1984

[51] Int. Cl.$^5$ .............................................. E41G 7/24
[52] U.S. Cl. .................................................. 244/3.13
[58] Field of Search ........................ 244/3.13; 356/152

[56] References Cited

U.S. PATENT DOCUMENTS

| | | |
|---|---|---|
| 2,930,894 | 3/1960 | Bozeman ............................ 244/3.13 |
| 3,255,984 | 6/1966 | Hawes ................................ 244/3.13 |
| 3,501,113 | 3/1970 | Maclusky ........................... 244/3.13 |
| 3,690,594 | 9/1972 | Menke ................................ 244/3.13 |
| 3,782,667 | 1/1974 | Miller, Jr. et al. ................. 244/3.13 |
| 4,111,383 | 9/1978 | Allen et al. ....................... 244/3.13 |
| 4,299,360 | 11/1981 | Layton ............................... 244/3.13 |
| 4,349,838 | 9/1982 | Daniel ................................ 244/3.13 |

*Primary Examiner*—Charles T. Jordan
*Attorney, Agent, or Firm*—Julian C. Renfro; Gay Chin; Michael L. Slonecker

[57] ABSTRACT

An optical system utilized to provide guidance information in the form of a modulated beam for a beamrider missile during its rocket powered flight phase. Our system comprises first and second zoom type optical subsystems arranged to function cooperatively in object space, utilizing coincident lines of sight, with these optical subsystems serving to provide guidance information to the missile when the exhaust plume from its rocket engine is relatively difficult to penetrate. The first optical subsystem is utilized in a closed loop servo system for positioning a mirror gimballed about two axes, such that it continuously tracks the missile. The second optical subsystem, along the optical axis of which the modulated beam is directed, comprises a negative optical group and a positive optical group combined into a defocusable beam expander. These groups are initially defocussed, and during flight of the missile, the negative group is movable in a linear manner away from the positive group, toward the focussed position, so as to maintain by utilization of the gimballed mirror, a constant beam diameter at the missile. This beam contains guidance information for directing the missile to a selected target, and quite advantageously, these positive and negative groups are constructed to be individually free of spherical aberration and coma, such that the shape of the transmitted beam is not disturbed in any of the zoom positions.

15 Claims, 12 Drawing Sheets

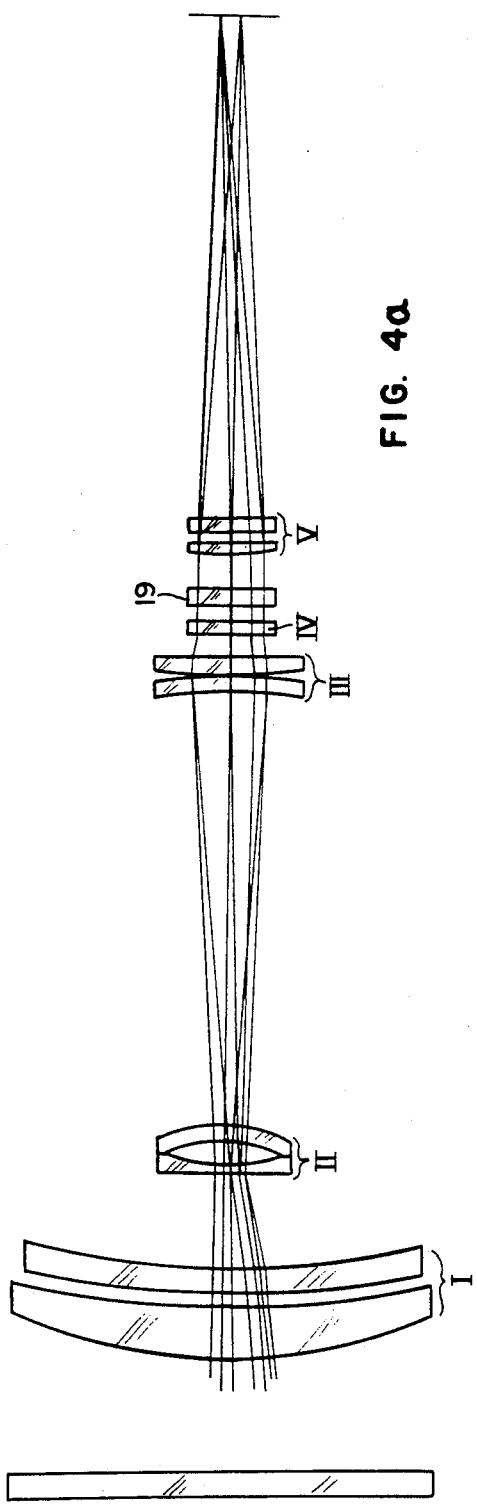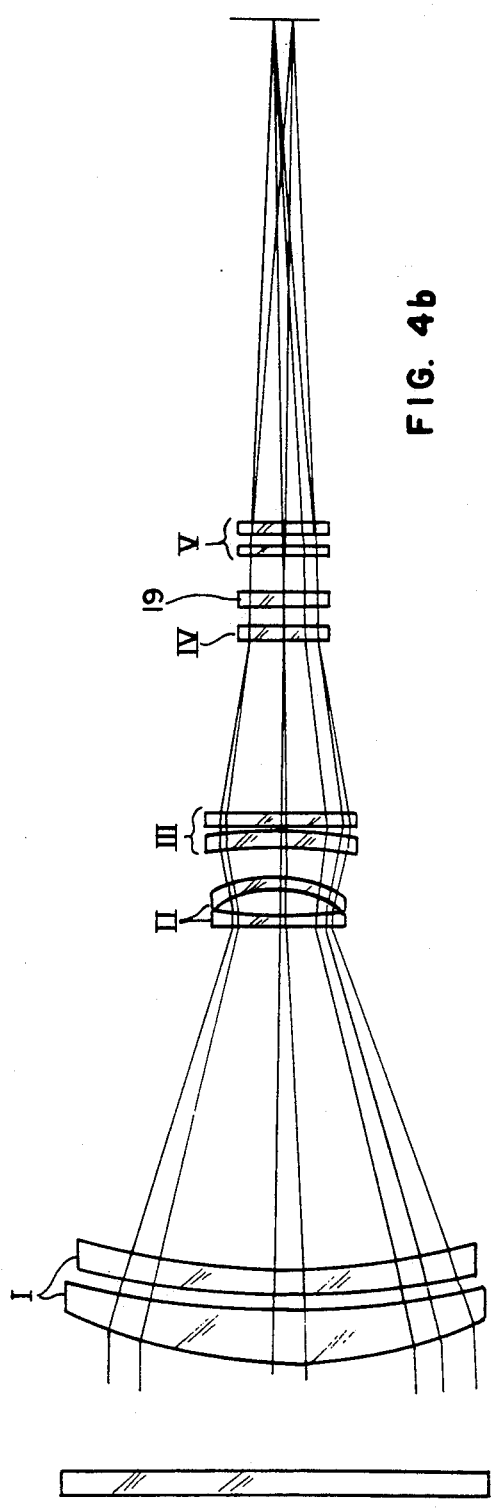

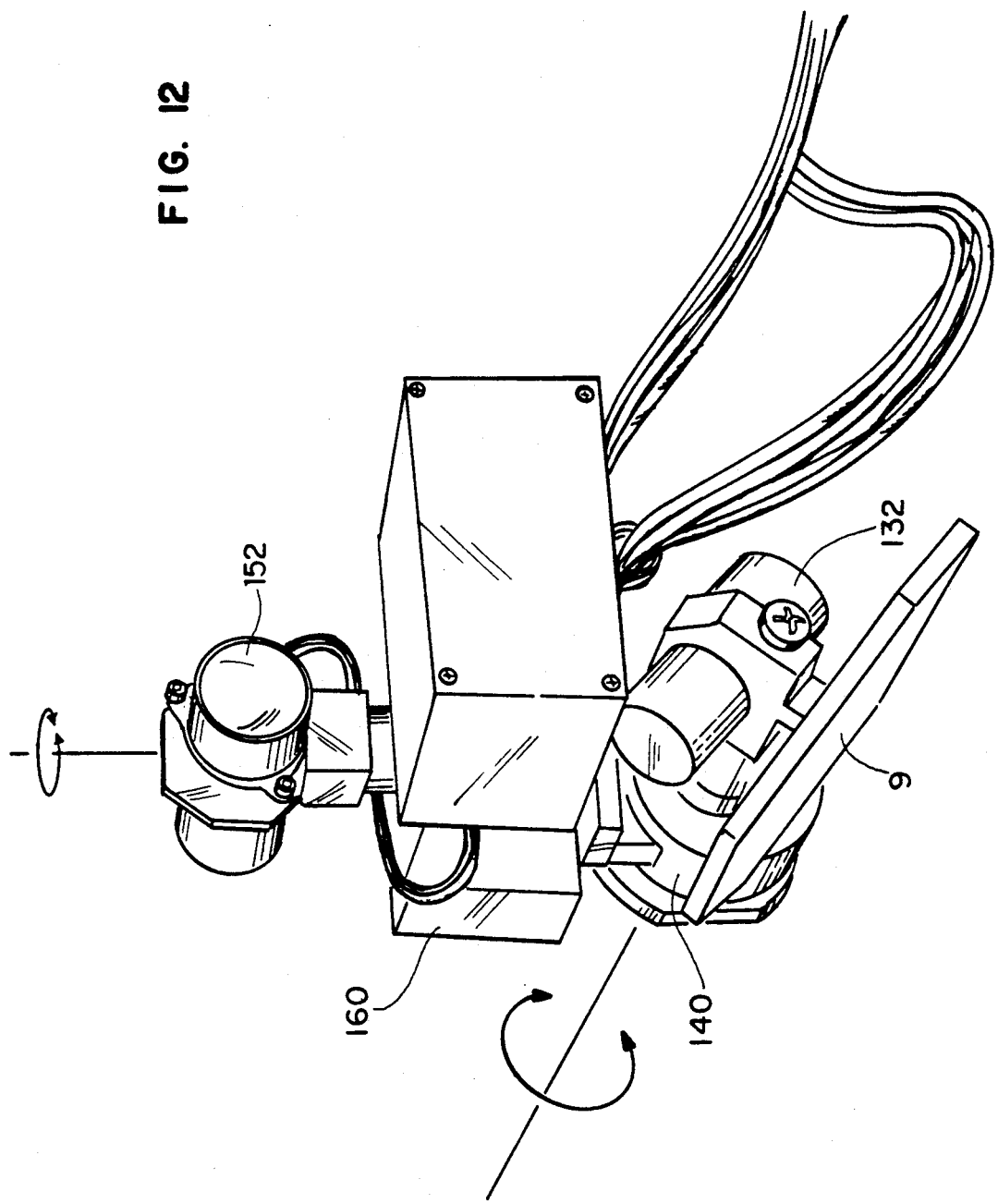

ND OPTICS

BACKGROUND OF THE INVENTION

This invention relates to techniques and implementing apparatus for providing optics suitable for the guidance of a beamrider type missile during the first, rocket-powered phase of flight, as well as during a phase immediately following, when the coasting missile is being precisely guided to the intended target by another set of optical components and their associated hardware.

DESCRIPTION OF THE PRIOR ART

A beamrider guidance system functions to maintain missile line of flight in a desired direction. Such systems are most readily applied to short range missile guidance problems and have found particular applications in surface to surface (primarily anti-tank) and surface to air (primarily short range air defense) missions.

A beamrider system generally includes a transmitting section and receiving section, with the receiving section being located on board the missile. In operation, an observer locates a target and projects a beam of electromagnetic radiation from the transmitter to the target. The beam of electromagnetic radiation may be viewed as a volume of radiation forming a guidance corridor to the target which, if followed by the missile, will cause it to strike the target at the desired location. To assure missile impact on the target, it is necessary for the missile, launched into the beam, to follow the beam axis during the flight.

This task may be accomplished by spatially modulating the beam at the transmitter, which modulation is detected and decoded at the missile receiver. The decoded modulation provides on board electronics with data indicative of missile position relative to the beam axis. The position data is used to generate error signals which are used by missile guidance devices to steer the missile along the beam axis. More specifically, spatial modulation of the guidance beam results in the formation of an illumination pattern over a cross-section of the beam. The illumination pattern divides the beam into a series of resolution elements, with each resolution element bearing a unique signature by reason of its modulation. The missile locates itself relative to the beam axis by detecting the modulation from the resolution element in line with its receiver.

It is known to spatially modulate the electromagnetic radiation beam of a beamrider guidance system in amplitude or frequency. Basic encoding mechanisms include analog AM, digital AM, analog FM, and digital FM modulation. Examples of known beam modulation techniques can be found in U.S. Pat. No. 3,690,594 to Menke, issued Sep. 12, 1972; U.S. Pat. No. 3,782,667 to Miller, Jr. et al., issued Jan. 1, 1974; U.S. Pat. No. 3,501,113 to MacLusky, issued Mar. 17, 1970; and U.S. Pat. No. 3,255,984 to Hawes, issued Jun. 14, 1966. Of particular interest to this invention are the teachings of U.S. Pat. No. 4,299,360 entitled "Beamrider Guidance Technique Using Digital FM Coding", which issued on Nov. 10, 1981 to the assignee of Allen C. Layton.

Certain modifications to the Layton technique, involving phase modulation, are set forth in a continuation-in-part application of Allen C. Layton, U.S. Ser. No. 316,151, filed Oct. 28, 1991, and these are of considerable interest. The latter Layton patent application teaches a similar encoding technique, utilizing digital phase modulation, which improves signal-to-noise performance. Also, the receiver is simplified, for it needs to be tuned only to one constant frequency.

In a conventional frequency modulation technique for spatially encoding a cross-section of a guidance beam of a beamrider system, such as that illustrated in the aforementioned Miller, Jr. et al. patent, the guidance beam is frequency divided into four quandrants by using four radiation sources, each of a different frequency. The modulated radiation from the four sources are combined into a single beam having the desired spatial modulation by directing the radiation from the four radiation sources through light pipes to a light pipe common junction. The combined radiation is transmitted to nutation projection optics for transmitting the beam to the target.

The target, which may be a missile, is provided with a single detector and cooperating receiving circuitry designed to calculate the time during which each modulation frequency is received at the missile detector during a beam nutation cycle. The missile is properly aligned to the beam axis when the detector receives each frequency for the same period of time during a single nutation cycle. The above described system may be termed an analog frequency modulation beam guidance system.

Another technique for providing analog frequency modulation to a guidance beam of a beamrider guidance system is illustrated in the aforementioned Menke patent. Menke develops frequency modulation of a guidance beam by nutating a rotating disc divided into a number of radiation transmitting pie-shaped sections and a like number of alternately arranged radiation opaque pie-shaped sectors.

The sectors are shaped in the described manner so that the width of each sector at a point close to the disc center is less than the sector width at the disc perimeter. The disc is rotated in the path of a guidance beam, thereby imparting frequency modulation to the beam. More specifically, the rotating disc functions to chop the guidance beam such that the rotating disc projects an image pattern across the beam cross-section, which pattern may be visualized as a series of different frequency divisions extending across the beam cross-section. When the rotating disc is nutated, a single detector only is required for locating the missile relative to the beam axis.

In the practice of one important aspect of our invention, we prefer to use an electromagnetic radiation beam guidance system which spatially encodes a guidance beam cross-section to develop a large plurality of resolution elements, as described at length in the above-cited U.S. patent of Allen C. Layton, U.S. Pat. No. 4,299,360. In accordance with that technique, each resolution element is uniquely designated by a digital code effected by frequency modulating the radiation in each resolution element according to a different digital word. Two encoding masks are used, which are divided into a plurality of bit areas, with each bit area being comprised of cyclically recurring, spaced apart bands which are effective to vary a detectable beam characteristic. Means are utilized for moving the encoding masks through the guidance beam whereby the beam is modulated at a frequency or frequencies determined by certain spacings between the bands of the bit areas.

To provide vertical positional information, one encoding mask is divided into a plurality of rows, the rows defining vertical resolution elements. Each row is comprised of a plurality of bit areas of sufficient number to uniquely designate each of the resolution elements. Then, in the vertical encoding mask, each bit area may be defined by a vertically disposed pattern of cyclically recurring, vertically oriented light transmitting bands, with the bands within each pattern being spaced from each other in a horizontal direction by a predetermined distance proportional to a given frequency, which frequency defines a logic level.

The horizontal position encoding mask, like the vertical mask, defines a plurality of resolution elements, through the use of a plurality of bit areas. To develop horizontal position information, the resolution elements appear as a series of columns defined by successively passing each bit area vertically through the radiation beam. Each bit area carries patterns of cyclically recurring, horizontally oriented beam modulating bands vertically separated from each by a predetermined distance defining a modulating frequency. The horizontal position encoding mask is moved vertically through the guidance beam to chop the beam at rates determined by the band spacings of the bit areas.

In a preferred embodiment of the Layton invention, the vertical and horizontal encoding masks are arrayed on disks that are rotated one at a time through the guidance beam, typically at a 60 Hz rate, to provide the missile guidance equipment with vertical and horizontal data relative to the beam axis.

However, as will be seen hereinafter, we found it undesirable to try to utilize the primary zoom projection optics immediately after launch of the missile, so we have now provided herein, a novel command optics arrangement involving first and second optical subsystems coacting such that a highly, concentrated guidance beam will be furnished to the missile during its motor burn period. Then, after motor burnout, a third optical subsystem may be utilized, which is based closely on the Layton teachings.

SUMMARY OF THIS INVENTION

This invention represents a novel optical system utilized to provide guidance information for a high performance beamrider missile having a rocket powered flight phase followed by a guided non-powered phase. The target may for example be an aircraft or tank, although other targets may be selected. We prefer the use of a $CO_2$ (Carbon Dioxide) laser, and guidance of the missile is basically accomplished by transmitting an appropriately coded laser signal to either or both of two receivers located on oppositely disposed fins at the rear end of the missile. Since the laser signals to the missile emanate from the rear, and the missile's receivers are pointed aft, counter-measures attempted by the aircraft or tank that has been targeted are largely ineffective.

The initial guidance concept planned for this missile system employed a single infrared zoom lens system, called the Zoom Projection Optics (ZPO), that would project a coded $CO_2$ laser beam of a size 12 meters by 12 meters, over the operative range from 500 meters to 6,500 meters. A code is generated by spinning two reticle wheels located at the focal plane of the Zoom Projection Optics. A large plurality of resolution elements is developed, each resolution element being uniquely designated by a digital code effected by frequency or phase modulating the radiation in each resolution element or cell of the matrix, according to a different digital word.

An azimuth reticle gives the missile left and right commands, and the elevation reticle provides up and down signals. Originally, the missile was to be launched within the field of view of the Zoom Projection Optics for capture by the spacially coded beam. Acquisition and guidance to the target could then be carried out with a single lens system.

Unfortunately, tests carried out early in the design phase indicated the need for a separate mode of operation of the missile during its initial phase of flight. This is because the exhaust from a rocket powered missile was far more troublesome than originally anticipated. In addition, the spatially encoded laser beam spread over a 12 meter by 12 meter area was so weak that it could not penetrate the missile exhaust and reach the receivers of the missile. Clearly an alternative approach for the initial phase of flight was needed.

In accordance with our important new concept, the missile is launched outside the field of view of the FLIR, TV and ZPO systems, which systems are always boresighted to each other, and mounted on a stabilized gimbal. A gimballed mirror combined with a Missile Tracker Zoom (MTZ) are mounted on the same stabilized gimbal. The MTZ, also known as the first optical subsystem, acquires and tracks the missile through the early stages of the flight. The MTZ provides a constant 12 meter diameter field of view around the missile as it moves from 150 meters to 2,250 meters from the launcher, and centers the missile by a closed servo loop controlling the gimballed mirror.

During this initial phase, a second optical subsystem is utilized, which is boresighted with the MTZ and shares the same gimballed mirror. This second optical subsystem is called Temporal Mode Laser Optics (TMLO), and it is intended to provide guidance information to the missile during the initial phase of flight. A path diverting mirror serves to divert the energy of the $CO_2$ laser away from the ZPO optical path during this initial phase, and into the TMLO path. This laser energy is modulated to provide the same general kind of azimuth and elevation signals as the chopped laser signals later to be provided through the ZPO. However, in this case, since the missile is centered in the MTZ field of view, and the TMLO is boresighted to the MTZ, the laser beam can be reduced to a 4 meter diameter, thereby concentrating the laser beam and gaining a factor of 9 in the signal strength. This is a sufficient laser signal to penetrate the plume from the rocket motor.

As can now be appreciated, the first mode is initiated shortly after launch. When the missile is approximately 100 meters from the launcher, the $CO_2$ laser is modulated by electrical switching at a 10 Kilohertz rate, and its output projected through the TMLO to provide guidance signals to the missile. This may be regarded as an equivalent of the reticle wheel code, and the missile is, in effect, oblivious to the origin of this code.

It is to be noted that the TMLO provides guidance in the form of displacement information from the LOS (line of sight). While the ability of the TMLO to ascertain location or position with respect to the desired LOS is equal to the ZPO at short range, the TMLO tends to become inaccurate at long range, as well as then being easier to jam.

When the missile, during coasting flight, is receiving information from the ZPO, the guidance it receives is highly accurate, and the missile can ascertain within ¾ of a meter, which cell of the matrix it is in.

As to specific details of our Command Optics system, the MTZ (first optical subsystem) tracking starts very shortly after launch, and serves to maintain a 12 meter diameter field of view around the missile from 150 meters out to 2,250 meters, accomplished by an appropriate zooming of the MTZ optics. The missile nozzle irradiance is focussed through the MTZ optics onto a four element detector. The detector output signals go to the missile tracker processing circuitry, which in turn serves through a closed loop to position the gimballed mirror onto the missile. Positional information is then obtained via resolver pickoffs on the two axis gimballed mirror, and processed through a resolver to digital (R to D) converter within the computer known as the Data Processing Unit (DPU). The information derived therefrom determines the type of guidance command to send to the missile, to bring it toward the target line of sight established by the FLIR or TV used for target tracking.

The missile position information is used to determine the correct code for laser transmission. The computer decides on the appropriate code, and changes the modulation format of the laser, so that the missile will be guided to the desired position for bringing it to the LOS to the target.

More details concerning this aspect are set forth in the copending patent application of George W. Shaw, Harold P. Glaser, and Max Amon entitled "Optical Guidance System for Beamrider Missile", U.S. Ser. No. 761,116, filed Jul. 31, 1985.

This mode continues until the missile is approximately 2,000 meters away, at which time the rocket fuel is exhausted, and the laser signal diverted to the ZPO path, also known as the third optical subsystem. This is accomplished by appropriate action of a path diverting mirror. The laser also switches to CW operation, and the coded reticle wheels located at the ZPO focal plane chop the laser beam, providing to the missile the equivalent type of guidance signals as previously produced by the modulated laser. The Zoom Projection Optics serve to maintain the 12 meter by 12 meter coded pattern pointed at the missile. The spatial encoding provided by the spinning reticle wheels defines the beam cross section into a series of resolution elements each identified by a different digital code. As long as the missile remains inside this pattern, it will receive these codes and be able to ascertain its precise position in the pattern of the beam. This information is then used to generate steering commands by the missile onboard computer, and cause movement of the missile fins such that the missile will be guided toward the center of the beam, and thereafter into impact with the target. Only when the missile is traveling along the center of the projected laser corridor will it not be receiving signals requiring it to move up or down, or left or right.

It is therefore a principal object of this invention to provide an optical system able to effectively track a beamrider missile during its initial phase of flight, and to penetrate even a dense motor plume with a coded laser guidance signal.

It is another object of this invention to provide a constant, four meter diameter laser beam on a missile, as it moves away from its launcher and is guided toward the selected target by the coding of the laser beam.

It is still another object of this invention to provide an integrated plurality of optical subsystems such that a beamrider type missile may be provided a highly concentrated guidance beam by the use of first and second optical subsystems during the powered phase of flight, when the exhaust plume from the missile may be relatively impenetrable, and then by a third optical subsystem during the coasting phase, when very precise guidance information is needed in order for the missile to strike the center of the intended target.

It is still another object of this invention to provide an integrated optical subsystem having a plurality of optical subsystems utilizing coincident lines of sight, for providing guidance information to a beamrider missile during powered flight, a first of which subsystems receives indications of the actual position of the missile, and moves an optical element such that a second optical subsystem can continue to provide appropriate guidance information to the receiver of the missile, such that the missile will be maintained on the path to intercept the target.

BRIEF DESCRIPTION OF DRAWINGS

FIGS. 4a and 4b are cross sectional showing of the zoom optic portions of the MTZ, with FIG. 4a showing the positions of zoom groups II and III at the time of launch, and FIG. 4b showing the position of these zoom groups at the time of motor burnout;

FIG. 12 is a somewhat simplified diagram of the gimballed mirror arrangement, and some of the components responsible for keeping it aimed at the missile being guided.

DETAILED DESCRIPTION

Figure 1:
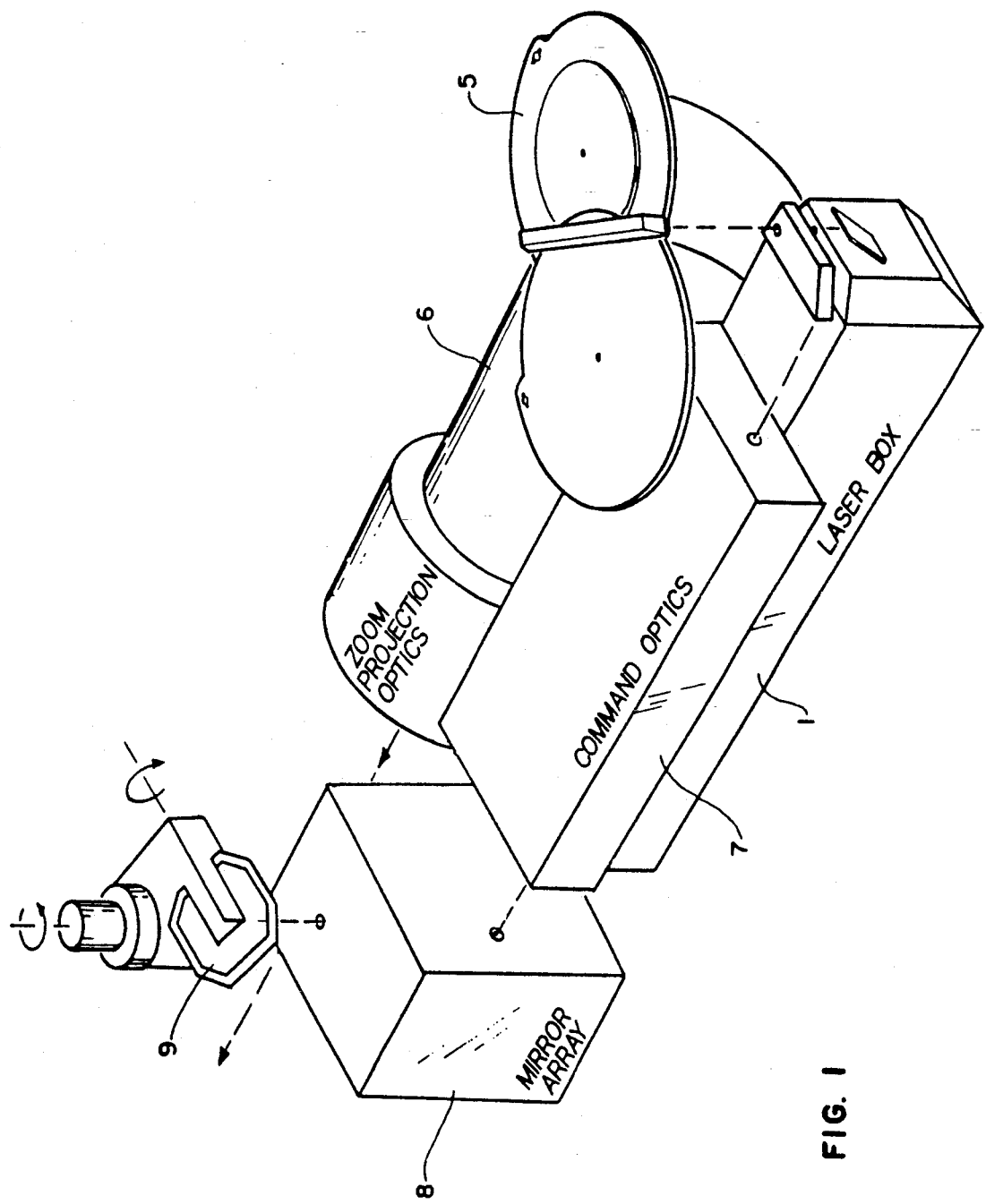
FIG. 1 is a block diagram setting forth the approximate operating relationships of the principal components of our optical system utilized to provide accurate guidance information for a beamrider missile.

Turning to FIG. 1, we have there utilized a type of assembly view in order to show the principal components of our novel optical system utilized to provide guidance information for a beamrider missile having a rocket powered flight phase followed by a guided, non-powered phase. The laser forming an important part of our beamrider guidance system, which preferably is a $CO_2$ laser, may be regarded as residing in laser box 1, with its output direction being generally to the right as viewed in FIG. 1. A suitable mirror directs this output upwardly as shown.

We found the exhaust plume developed by the rocket motor of a particular missile was of a nature such that it could not be penetrated by the coded 12 meter diameter laser beam projected by our preferred laser guidance arrangement, known as the Zoom Projection Optics (ZPO), and located at 6 in FIG. 1. Accordingly, this led us to provide the Command Optics 7, depicted in FIG. 1 just above the laser box 1, that is used during powered flight of the missile. As will be described at some length hereinafter, the Command Optics principally comprises first and second optical subsystems, namely a Missile Tracker Zoom (MTZ) and a Temporal Mode Laser Optics (TMLO), coaligned and combined into a single package, which subsystems are arranged to function cooperatively in object space. These first and second optical subsystems are associated with the initial guidance of the missile, and have coincident lines of sight to the missile.

The MTZ acquires and tracks the irradiance of the rocket motor of the missile during the motor burn, and positions a gimballed mirror such that the second optical subsystem, the TMLO, which has a line of sight coincident with the LOS of the MTZ, will project a laser beam to the missile during this phase. The TMLO sufficiently concentrates the $CO_2$ laser beam as to be able to penetrate the missile plume, and place guidance signals directly on one or both of the missile receivers, not shown herein. Then, after burnout of the missile motor, typically occurring several seconds after the launch (approximately three seconds in accordance with one particular design), the third optical subsystem, the Zoom Projection Optics 6, takes over and guides the missile in a very accurate manner to its intended target. Counter-rotating reticle wheels 5 are then utilized in conjunction with the laser for furnishing precise positional information to the missile. These wheels are counter-rotating disks whose configurations are closely based upon the teachings of the Allen C. Layton patent, U.S. Pat. No. 4,299,360, which issued Nov. 10, 1981, and the teachings of the Layton patent are herein incorporated by reference.

Figure 2:
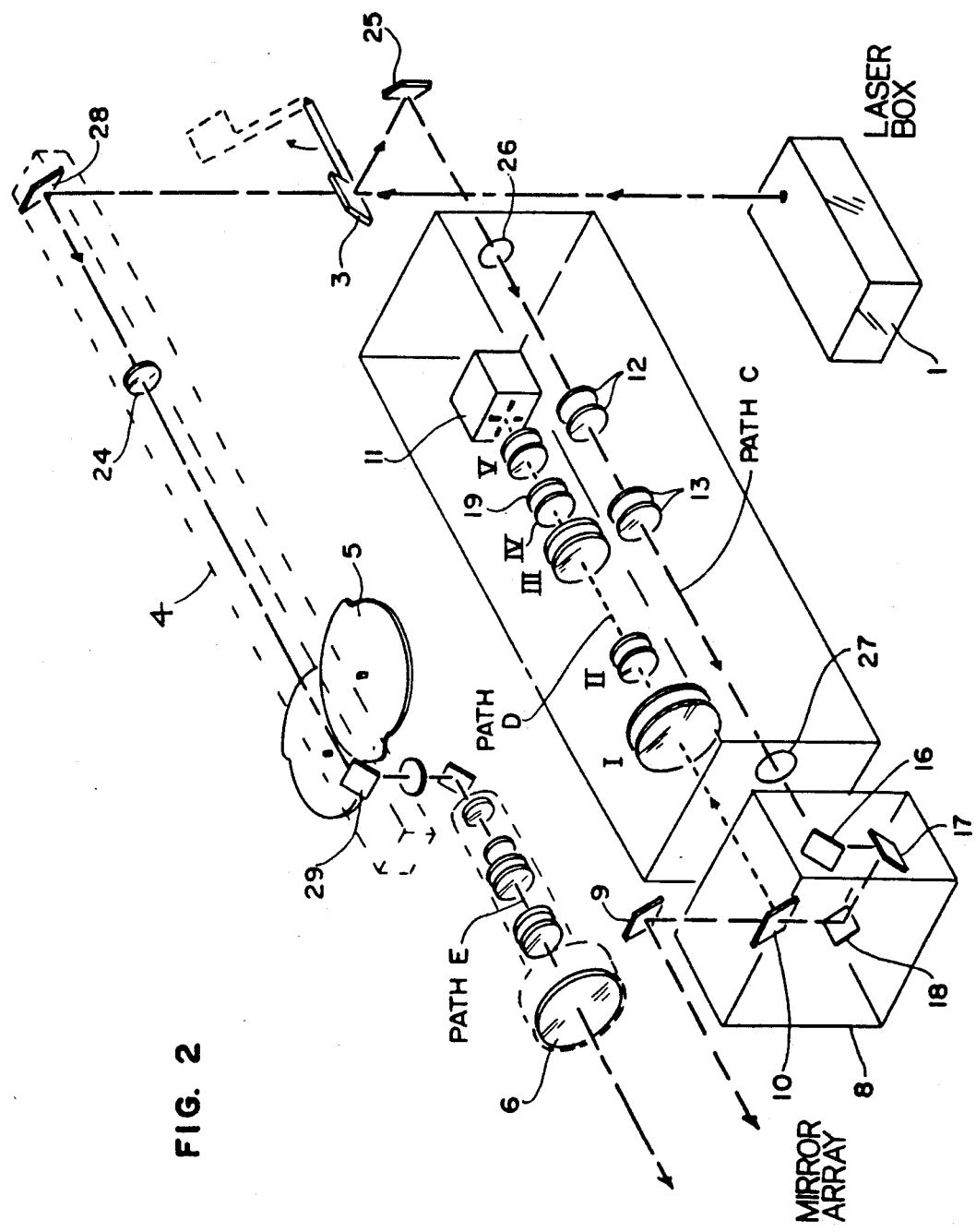
FIG. 2 is a schematic type showing of the principal optical components of the command optics, revealing the light path associated with guidance information being sent to the missile during powered flight; the light path of position information back from the missile during powered flight; and the light path through the zoom projection optics during the terminal, coasting phase of the flight of the missile.

Turning now to FIG. 2, we have there shown in exploded relation, the light paths associated with the sets of optical components, with the TMLO represented by Path C, the MTZ represented by Path D, and the ZPO represented by Path E.

During the phase in which the missile motor has been ignited, and the missile is in powered flight, guidance is provided to the missile by the modulated laser and projected by the optics associated with the TMLO path. Light energy at 10.6 $\mu$m emerges from laser exit port of laser 1 and initially strikes mirror 3, which directs this energy onto fold mirror 25. It is to be noted that mirror 3 is movable, preferably rotationally movable, so that the laser energy can be directed into either of two distinctly different directions. Initially the laser energy is directed along Path C, and later along Path E, as will be discussed in detail hereinafter.

Figure 3A:
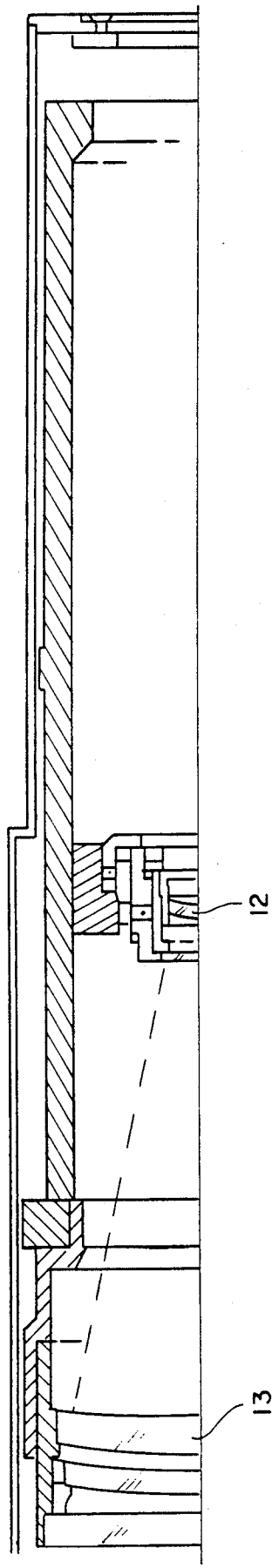
FIGS. 3a and 3b are cross sectional showings of the zoom type optic portions of the TMLO, with FIG. 3a showing the position of the negative lens group at the time of launch, and FIG. 3b showing the position of the negative group at the time of motor burnout.
Figure 3B:
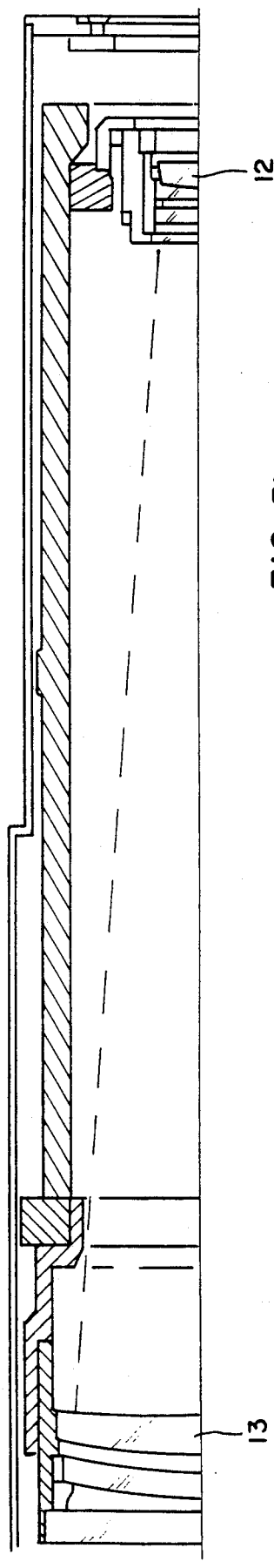

Fold mirror 25 serves to direct the laser energy through window 26 and thereafter through the TMLO optics, which include negative doublet 12 and positive doublet 13. FIGS. 3a and 3b reveal these components in greater detail, with FIG. 3a showing the relationships at time of launch, and FIG. 3b illustrating the components' position at time of motor burnout.

The TMLO groups are constructed to be individually free of spherical aberration and coma, so that the shape of the transmitted laser beam is not disturbed in any of the zoom positions. Thus, when these groups are combined into a defocusable beam expander, and the groups are then defocused with respect to one another, no hot spots develop, and a Gaussian beam is advantageously maintained throughout the zoom range. Although other zoom type optics are utilized in the other light paths, the TMLO is afocal, and beam divergence is controlled by appropriate movement of the negative lens group, such as by a cam, in the manner to be discussed in connection with FIG. 5, in order that a consistent 4 meter diameter laser beam is constantly maintained on the aft part of the missile as the missile continues to move away from the launcher, and to approach the target.

The TMLO zoom type optics are thus basically in the form of a simple 8× Galilean afocal telescope, and laser divergence is controlled by defocusing the negative lens group 12. Thus, in FIG. 3a the optical subsystem is defocused and the laser beam has maximum divergence. Then, in FIG. 3b, the subsystem is fully focused, and the laser beam divergence is minimized. It is therefore to be seen that beam divergence can be accurately controlled by the proper positioning of the slidable negative lens group, and the motion of the negative lens group from the position comparatively close to the positive group, as shown in FIG. 3a, to the position shown in FIG. 3b, is linear.

In addition to each doublet of the afocal being individually corrected, each doublet has also been designed to be passively athermal over the operating temperature range of +10° C. to +40° C. That is, the optical materials and components powers have been selected to yield this unique condition.

It is important to note that boresighting problems are greatly lessened by having only one of the TMLO lens groups movable in a zoom type manner, which is to be contrasted with the complexity associated with a mechanically or optically compensated zoom system.

Although we are not to be limited to any one design, the preferred TMLO optical design for the defocussed (minimum divergence) position is as follows:

| No. | Radius | Thickness | Material |
| --- | --- | --- | --- |
| 1 | −2.037 | 0.201 | ZnSe |
| 2 | 130.211 | 0.099 | Air |
| 3 | 26.840 | 0.201 | Germanium |
| 4 | −26.840 | *14.503 | Air |
| 5 | −34.173 | 0.500 | ZnSe |
| 6 | −10.335 | 0.201 | Air |
| 7 | −9.202 | 0.300 | Germanium |

-continued

| No. | Radius | Thickness | Material |
|---|---|---|---|
| 8 | −10.688 | | Air |

*Surface 4 airspace is variable. All units in centimeters.

It is to be noted that surfaces 1 through 4 relate to the negative group, whereas surfaces 5 through 8 relate to the positive group.

Returning to the description of FIG. 2, the laser energy passing along Path C and through the negative and positive doublets exits through window 27, is redirected by mirrors 16, 17 and 18, and then strikes mirror 10, which is dichroic. On occasion, we may refer to mirrors 16, 17 and 18 as forming a mirror array 8.

With regard to mirror 10, this dichroic has a special coating which makes it a long wave pass filter. The coating on the Germanium substrate reflects 3.5 $\mu$m to 4.2 $\mu$m energy, to which energy the detector of the MTZ is sensitive. On the other hand, the $CO_2$ laser energy, which is at 10.6 $\mu$m, is passed. Since mirror 10 is in effect transparent to the 10.6 $\mu$m energy, the laser energy traversing Path C through the TMLO optics continues and is then reflected by the gimballed mirror 9 toward the missile in order to guide it to strike the selected target.

The gimballed mirror 9 is kept pointed at all times toward the missile, by means of a closed loop servo discussed at length hereinafter in connection with FIGS. 11 and 12. By means of one or more detectors placed at the rear edges of the missile fins, the guidance signals evolved by suitable modulation of the laser, and passing through the TMLO optics may be utilized by the missile's guidance system. The arrangement by which the detectors on the rear of the missile are protected from the noise associated with the energy of the motor of the missile is the subject of a copending patent application filed in the names of Max Amon and Clifford Luty entitled "TIR Window", U.S. Ser. No. 612,194, filed May 21, 1984.

The modulated laser signals passing through the TMLO components are received by the missile and are interpreted as guidance signals such that the missile will move ever closer to the line of sight to the target, which line of sight is being maintained by TV and FLIR target trackers. Of interest is the fact that the missile receiver regards the modulated laser signals from the TMLO optics as the substantial equivalent of the information subsequently provided by the chopped laser signals from the Zoom Projection Optics, as will be elaborated hereinafter.

Also located in the Command Optics as shown in FIG. 2 is the focal zoom group of optical components known as Missile Tracker Zoom (MTZ), which are disposed along Path D. The MTZ is a 15:1 infrared zoom optic operative in the spectral range of 3.5 $\mu$m to 4.2 $\mu$m. The focal length varies from 1.25" to 18.75" as a function of the carefully predetermined input voltage.

Energy from the hot missile nozzle in the aforementioned spectral range strikes the gimballed mirror 9, and is thereby reflected by the dichroic 10. Since as previously mentioned, the dichroic is not transparent to energy in the spectral range of 3.5 $\mu$m to 4.2 $\mu$m, it serves to reflect this energy along the MTZ, Path D.

As revealed in FIG. 2, this energy from the missile exhaust initially passes through afocal Groups I, II, III, and IV of the MTZ, and then through the scanner 19. Latter is a device in the nature of an optical wedge that is caused to rotate rapidly, such as at 7,200 RPM. The scanner 19 may be of silicon, and serves to deviate the axial beam 1½°, for example. However, we are not to be limited to the use of a wedge, which nutates the beam, for as an alternative, we could use a nutating mirror, a Pechan prism, or a K-mirror, which would rotate the beam.

The MTZ components in FIGS. 4a and 4b respectively represent the zoom components at launch, and at motor burnout.

As will be obvious to those skilled in the art, the MTZ optics gather the radiant energy emanating from the motor of the missile, and serve to focus such radiant energy sharply on a detector. FIG. 4a reveals that lens Group I utilizes large lenses, selected for their energy gathering ability, and in this figure, the zoom components, lens Groups II and III, are in their widely separated, short focal length positions. At this point, ample illumination is available, and the zoom components are here serving to expand the light to the size of the scanner 19, which operates in collimated space.

As the missile moves away, lens Groups II and III are caused to move so as to reduce their separation, thus to approach the long focal length condition. As will be seen in connection with FIG. 5, lens Group II travels a greater distance than Group III. By the time the long focal length condition shown in FIG. 4b is reached, the entire front aperture is serving as a collector, and the optical components at this point are serving to constrict the irradiance from the rocket motor down to the size of the rotating scanner 19.

After then passing through imager Group V, the energy from the missile exhaust is detected. We use a detector 11 that preferably utilizes four radially disposed detector components arranged in a circular, four bar array, and the spot of light representative of the missile location is caused to nutate with respect to these bar-shaped detectors, which are located every 90° in the aforementioned arrangement.

From a study of the output pulses from the detector, a determination can be made that establishes any misalignment of the mirror 9, and the direction the mirror must be moved by the closed loop servo system, in order that the image of the missile will be symmetrical with respect to the four circularly arrayed components of detector 11. Although the details of the servo arrangement are not believed to be per se patentable, they are discussed in connection with FIG. 11. Also, we show a simplified version of the gimballed mirror, and the components used in the controlling thereof in FIG. 12.

Thus, the hot missile nozzle enables the MTZ to track the missile and hold it in the central portion of the 12 meter field of view. Importantly, the field of view is held constant by the zoomable afocal section of the MTZ, which is zoomed as the missile moves ever closer toward the target. Advantageously, the MTZ is passively athermal. The MTZ components are designed to run along very true guide rails, and to utilize preloaded bearings. Some of these details will be discussed in conjunction with FIG. 5.

As should now be clear, the Command Optics, involving the TMLO and the MTZ, are principally utilized during the phase of missile flight in which the rocket engine is burning. Since the tracker can locate the missile to a small tolerance, the coded laser signal, transmitted through the TMLO, may be a compact beam, approximately 4 meters in diameter at the missile, which is sufficiently dense as to be able to penetrate the missile plume, and reach the missile receiver. Thus, the MTZ, also herein referred to as the first optical subsystem, acquires and tracks the missile from a point very shortly after launch, and the TMLO, the second optical subsystem, is able by means of gimballed mirror 9 positioned by the MTZ function to deliver a temporally modulated beam of a consistent four meter diameter at the missile, that steers the missile until motor burnout.

Obviously, we are not to be limited in the use of the command optics to this particular situation, for our command optics alone could be used for the entire travel of the missile in the event of a nearby target.

After motor burnout, the coded twelve meter diameter laser beam projected through the Zoom Projection Optics 6 (ZPO) serves to guide the missile with less likelihood of jamming than could be accomplished through the continued use of the TMLO. The ZPO optics are brought into play by the movement of the mirror 3 away from the full line position shown in FIG. 2, and into a position permitting the energy output of the $CO_2$ laser 1 to strike mirror 28 (see FIG. 2), directing light energy through spreader 24 and thence to be reflected by mirror 29. This latter mirror directs light through the periphery of rotating disks 5, which serve to provide vertical and horizontal data of the missile relative to the ZPO line of sight (LOS). These disks are constructed in accordance with the teachings of the Layton Pat. No 4,299,360 and will be discussed at greater length in connection with FIGS. 8 and 9. The operation of the ZPO will be discussed at greater length hereinafter.

Figure 5:
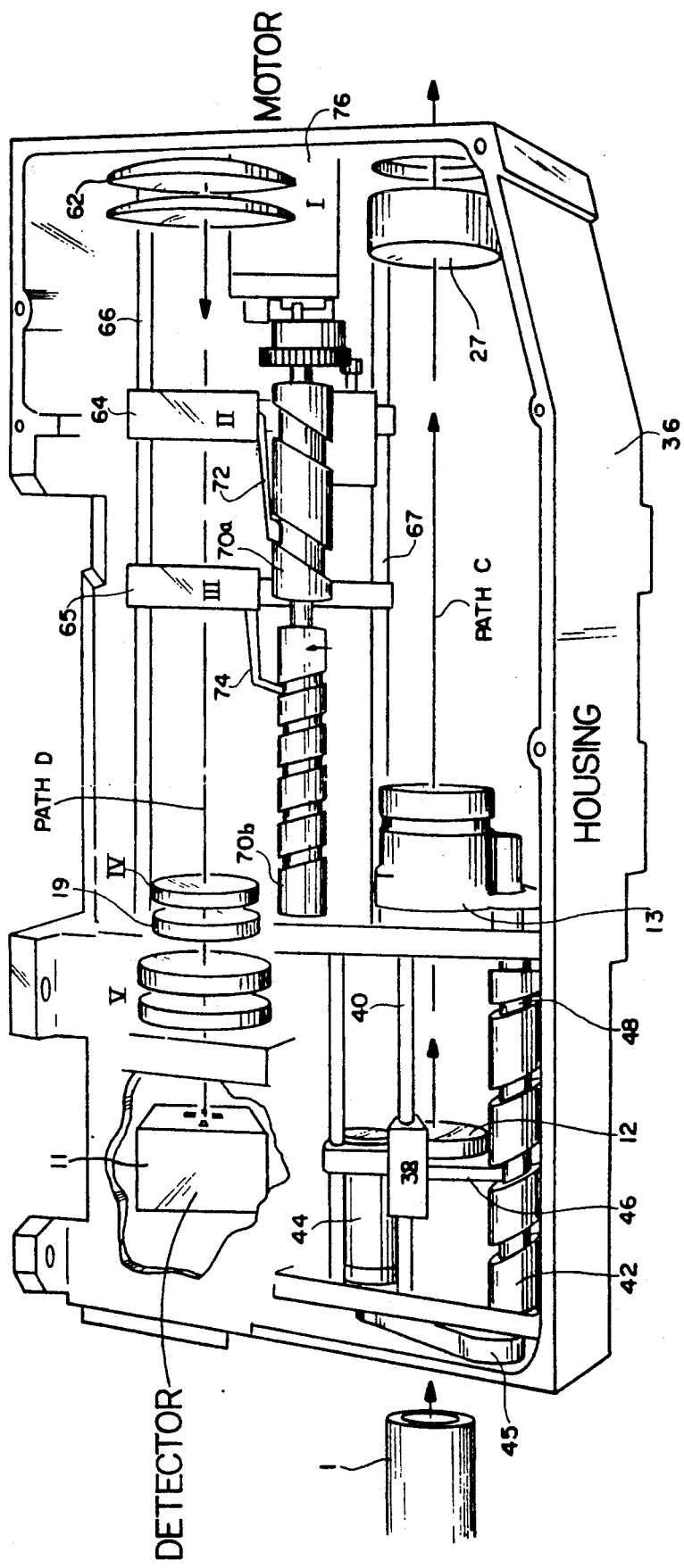
FIG. 5 is a somewhat simplified view, partly in section, of the command optics components, with this view revealing the TMLO optical components and light path, and also the TMLO cam, as well as showing the MTZ optical components and their light path, and also the double cam utilized by the MTZ.

Turning now to FIG. 5, it will there be seen that we have shown the housing 36 in which the principal command optics components are mounted in operative relation. Portions of the cover of this housing have been removed in order to permit the significant TMLO and MTZ components to be viewed in their approximate operative relationships, and it to be noted that the components of the TMLO are so related to the MTZ components that the lines of sight of these two optical subsystems are parallel. However, we are not to be limited to this particular arrangement.

With regard first to the TMLO optical components, which are arrayed along Path C, the output of laser 1 may be regarded as entering at the lower left hand corner of housing 36 as viewed in FIG. 5, and then moving through the movable negative doublet 12 and thereafter passing through the fixed positive doublet 13, before passing out through the window 27, and thence into the mirror array 8, not shown in FIG. 5. This array comprises mirrors 16, 17, 18, and 10 as shown in FIG. 2. Thereafter the laser energy is directed via gimballed mirror 9, shown in FIG. 2, to provide guidance to the missile during the time of its motor burn.

So that movable lens 12 will move precisely along Path C as it is moved from its defocused position shown in FIG. 3a into its fully focussed position shown in FIG. 3b, the lens 12 is mounted in a form of lens carrier 38 that is adapted to slide along rod or rail 40, as well as another rod (not shown) parallel to the rod 40, with this arrangement being such that a sturdy support for the lens is formed, thus preventing any undesired lateral movement of the lens from taking place.

A rotatable cam 42 generally in the configuration of a worm gear is utilized for bringing about a timed movement of the lens 12 along the Path C so that the movement from the position of maximum divergence into the fully focussed position will take place in a precisely pre-ascertained manner, such that a constant 4 meter diameter spot is maintained at the missile as the latter moves away from the launcher. A motor 44 is disposed generally adjacent the Path C, with its rotative output being delivered by means of a belt 45 to one end of the rotatable cam 42.

A cam follower in the form of a finger 46 is attached to the lens carrier, with the remote end of such finger designed to engage the helical groove 48 cut into the outer surface of the cam 42. Thus, as the cam rotates, it causes the lens carrier 38 and its negative lens 12 to move precisely in a preascertained, substantially linear manner toward the fully focussed position shown in FIG. 3b.

Turning now to the MTZ and the optical components associated with Path D, it is first to be noted that Path D is parallel to Path C. It is also to be noted that illumination from the motor of the missile is received through the lenses of the collecting optics 62, also known as Group I. This illumination is then directed along Path D through lens Group II, and thence through lens Group III. These latter groups are also given the nomenclature 64 and 65, respectively. Also shown in this figure are Group IV, the collimating lens, and Group V, the imaging group.

The Groups II and III are to be moved such that a 12 meter diameter field of view is maintained around the missile from 150 meters out to 2,250 meters. To this end, the zoom groups are slidably mounted on fixed rods 66 and 67, as shown in FIG. 5, so that their movements will be precisely along Path D of the MTZ as the zoom groups are moved from the wide field of view (short focal length) relationship shown in FIG. 4a, into the narrow field of view (long focal length) relationship shown in FIG. 4b.

Although we are not to be limited to a particular design, the preferred optical design for Missile Tracker Zoom in its long focal length position is as follows:

| No. | Missile Tracker Zoom | | |
| --- | --- | --- | --- |
| | Radius | Thickness | Material |
| 1 | 85.350 | 10.000 | Silicon |
| 2 | 181.750 | 2.000 | Air |
| 3 | 184.060 | 4.000 | Germanium |
| 4 | 123.400 | *15.927 | Air |
| 5 | 249.880 | 2.000 | Silicon |
| 6 | 40.580 | 5.000 | Air |
| 7 | −18.030 | 2.000 | Silicon |
| 8 | −21.210 | *74.738 | Air |
| 9 | −140.630 | 3.000 | Silicon |
| 10 | −80.410 | 0.200 | Air |
| 11 | 144.700 | 3.000 | Silicon |
| 12 | −796.800 | *3.478 | Air |
| 13 | −303.130 | 2.000 | Silicon |
| 14 | 132.200 | 5.000 | Air |
| 15 | infinity | 3.000 | Silicon |
| 16 | infinity | 4.000 | Air |
| 17 | 61.310 | 2.000 | ZnSe |
| 18 | −148.430 | 2.000 | Air |
| 19 | −127.740 | 2.000 | Germanium |
| 20 | 4170.000 | 86.452 | Air |
| 21 | inf (image) | | |

All dimensions in millimeters
*Variable airspaces to get EFL of Zoom.

In the above table, the surfaces are relatable to the designated optical component groups as follows:

| GROUP No. | SURFACE NO. |
| --- | --- |
| I | 1–4 |
| II | 5–8 |
| III | 9–12 |
| IV | 13–14 |
| Scanner 19 | 15–16 |
| V | 17–20 |

As will be noted from FIG. 5, the right side 70a of the MTZ cam is of a different hand than the left side 70b of this cam, so as the cam rotates, the lens Groups II and III will be caused to move toward each other, such that the desired amount of zooming action will be brought about. By virtue of the slidable mounting of lens Groups II and III on sturdy support rods 66 and 67, the respective optical components will be caused to move precisely along the Path D as the zooming is brought about, with no lateral movement being involved.

It is to be understood that the left side and the right side of the MTZ cam are each cut in a helical path, such that as the cam is driven in rotation by the motor 76, the cam followers or fingers 72 and 74, associated with the grooves on the right and left portions of the MTZ cam will cause the lenses to move in opposite directions in a converging manner, consonant with zooming to be brought about. From the noticably different cut of the two sides of MTZ cam, it can be deduced that lens Group II travels a greater distance than does Group III. This is of course consistent with the showing of FIGS. 4a and 4b.

After passing through lens Groups I, II and III, the radiant energy from the missile then passes through fixed optical component IV, and thereafter passes through the rotating scanner 19. The device 19 is preferably in the form of an optical wedge that is driven in rotation, for example at 7,200 RPM by a motor that is preferably an 115 Volt, 400 Hz, 3 phase motor. However, certain other optical devices could be substituted if such be desired. Subsequently, lens Group V serves to focus the 3.5 $\mu$m to 4.2 $\mu$m energy from the missile engine exhaust onto the detector 11.

The detector 11 receiving the radiant energy is of the four bar type, with four radially disposed detector elements being arrayed around at 90° intervals. If the missile is precisely aligned with the gimballed mirror, the detector output will be in the form of four equally spaced pulses, whereas if the missile is off axis with respect to the gimballed mirror, the output pulses are arrayed in a non-symmetrical manner. These pulses are then discriminated such that the proper interpretation of the pulse spacing is brought about. This information is then utilized in the ground based computer in order to bring about the desired movement of the mirror 9 such that the TMLO will maintain proper contact with the missile. The servo loops associated with the mirror 9 are discussed in detail in connection with FIG. 11, and the mirror and its specific operation are revealed in greater detail in FIG. 12.

Figure 6:
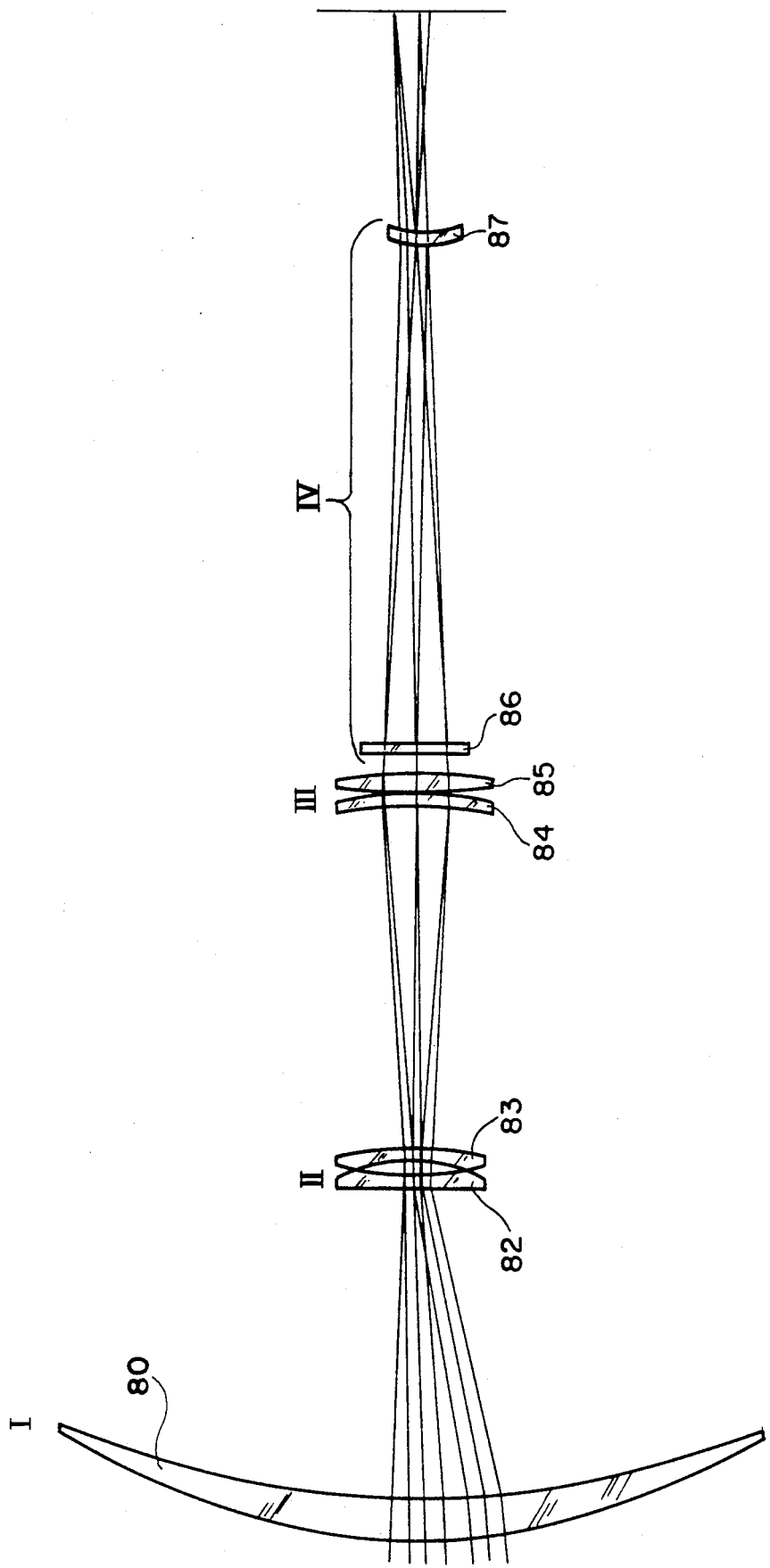
FIG. 6 is a cross sectional view of the ZPO components in their wide field of view relationship, which exists at the time the missile commences its coasting flight.
Figure 7:
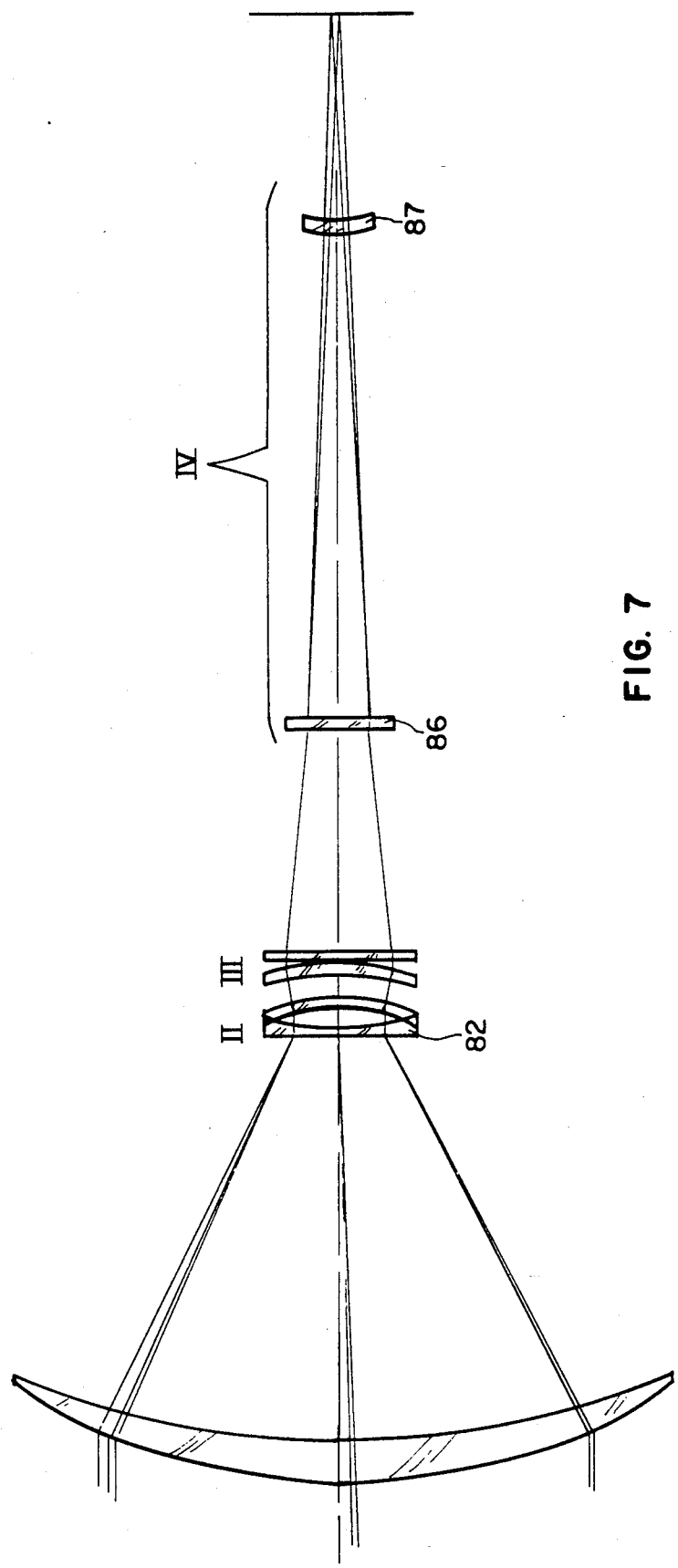
FIG. 7 is a cross sectional view of the ZPO components differing from FIG. 6 in that the components are in their narrow field of view relationship, which exists in the terminal phase of missile flight, immediately before impact with the target.

Turning now to the Zoom Projection Optics, the position of these components at motor burnout is depicted in FIG. 6, where the movable components are in the wide field of view (short focal length) positions, whereas FIG. 7 reveals the movable components in the narrow field of view (long focal length) relationships, which exist as the missile is closely approaching the target.

With regard to FIG. 6 wherein the zoom lens is in the short focal length position, it may be helpful to consider the components in four groups. Group I involves the principal element 80, which is of Germanium and having a spherical outer surface, and an aspheric inner surface. Group I represents the primary control of focus at the long focal length. This is primarily a factory type adjustment.

Groups II and III are known as the converter, or zoom section, with Group II involving elements 82 and 83, and Group III involving elements 84 and 85. In the changing of focal length of the total lens, Groups II and III move in opposite directions in a converging manner, and at different rates.

Group IV involves two comparatively widely spaced elements, 86 and 87, and this group is the focusing part of the lens, serving to form an image at the image plane. Group IV has a movable element 86 and is responsible for focus at the short focal length as a factory adjustment.

There is a very definite relationship between Group I for focus at the long focal length, and Group IV for focus at the short focal length associated with the movements of Groups II and III to maintain focus at the image plane while the focal length is being changed.

Although not depicted herein, it is to be realized that the lens elements of Groups II and III are slidably mounted on two stationary parallel rods mounted inside of a rotatable cylindrical barrel. More particularly, the lens elements of Group II are mounted in a lens holder attached to a sleeve, with this sleeve riding on bearings surrounding the rods.

Similarly the lens elements of Group III are mounted in another lens holder attached to a sleeve, this latter sleeve riding on a different set of bearings that surround the rods.

Respective cam slots for Groups II and III are cut or otherwise formed around the interior circumferential portions of the cylindrical barrel, which cam slots are engaged by respective cam followers located on the lens holders of Groups II and III. The opposite ends of the cylindrical barrel are mounted on bearings, and as the barrel is driven in rotation, the lens holders are caused by their cam followers to move along the rods. Precision construction is used throughout, so movements of element Groups II and III in response to barrel rotation is closely in accordance with desired movements of Groups II and III to accomplish the zooming action responsible for keeping the 12 meter by 12 meter beam on the missile over the operative range, from say 500 meters out to 6,500 meters.

Element 80 is also mounted in a movable lens holder slidable in bearings along a mounting shaft, this arrangement providing for focussing for the zoom lens at the long focal length. Somewhat similarly, element 86 is mounted in a holder mounted on bearings such that a correction for focus at a short focal length can be accomplished.

We also prefer for Group I to be moved in a focussing manner as a function of temperature variation. We use an arrangement made up of rods of widely varying temperature coefficient such that as temperature varies, the difference in expansion of these rods causes Group I to move and to maintain focus.

In our ZPO device, suitable temperature compensation is described, such that focus is maintained over a wide temperature range. Significantly, our ZPO device is able to zoom between a six inch focal length and an eighty inch focal length.

Returning to FIG. 2, it is to be realized that by an appropriate timer means timed to substantially coincide with the missile motor burnout, the mirror 3 is caused to rotate out of the way, such that the energy of the $CO_2$ laser enters the condenser assembly 4 leading to the ZPO optics, and no longer passes along Path C. In the condenser assembly, a mild negative lens 24 is utilized to spread the beam somewhat, which beam is then projected as a reticle pattern by the previously mentioned reticle wheels 5.

Figure 8:
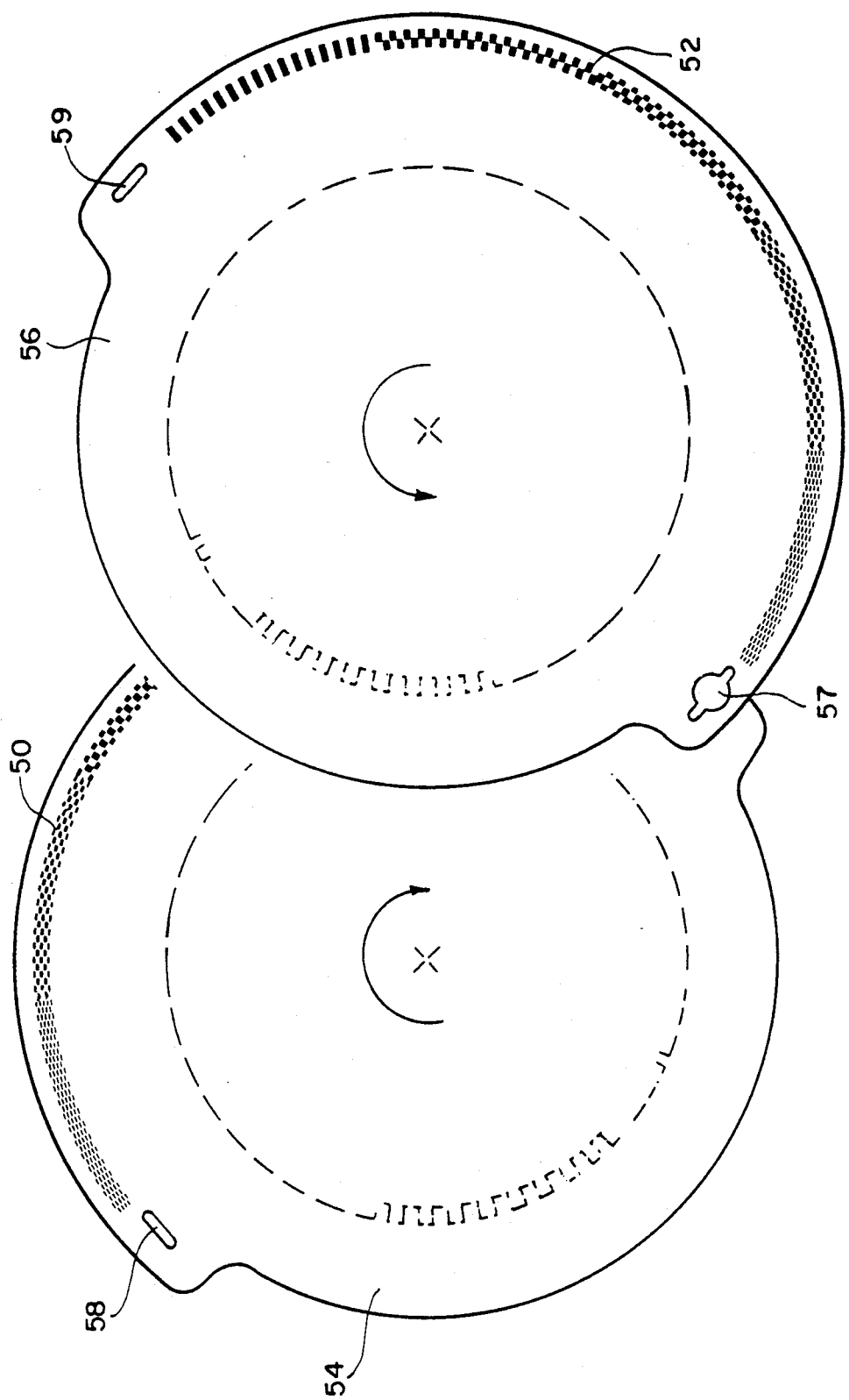
FIG. 8 is a view of the counter-rotating reticle wheels disposed at the focal plane of the ZPO, with the wheels in this instance being stopped in the position enabling initial laser alignment.
Figure 9:
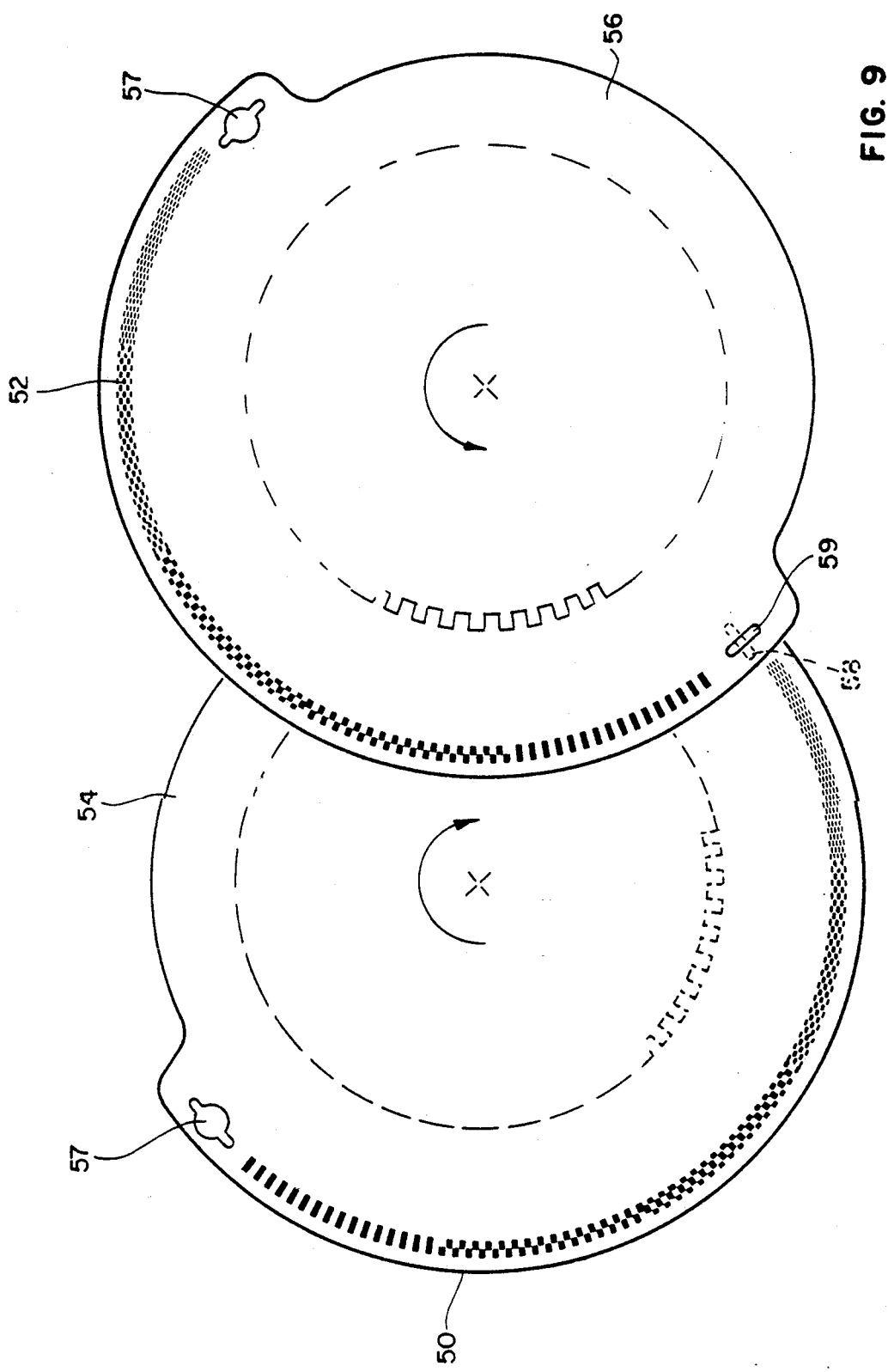
FIG. 9 is another view of the counter-rotating reticle wheels, this time stopped in the position enabling boresight.

The encoder wheel assembly 5 is principally comprised of a vertical resolution encoder wheel segment 50, and a horizontal resolution encoder wheel segment 52; see FIGS. 8 and 9. The encoder wheels 54 and 56 are suitably connected to a respective drive gear (not shown). The vertical drive gear and the horizontal drive gear are arranged to mesh, and are driven in a counter-rotating relationship preferably by a single motor. To this end, the main drive gear, coupled to the motor (not shown) engages one of the drive gears. The encoder segments 50 and 52 each occupy less than 180 degrees. In this way, they may be made to rotate, preferably one at a time, through the laser beam, there being no overlapping of the segments 50 and 52 in the area of the beam. Rotation in this instance may be in the direction of the arrows appearing on members 54 and 56 in these figures.

In order to simplify initial alignment of the laser, we provide a comparatively large, generally circular aperture 57 near the periphery of each of the reticle wheels, as best seen in FIG. 9. Then, when the wheels are in the position illustrated in FIG. 8, the laser beam can easily pass uninterruptedly through these aligned, circular apertures.

Although the disks are counter-rotating at a uniform rate during the transmission of the guidance information to the missile, they must be stationary during the boresighting procedure. A short circumferential slot is cut in discs 54 and 56 for boresighting purposes, these being the slots 58 and 59, as best seen in FIG. 8. Thus, when the disks are stopped in the position shown, in FIG. 9, boresighting can be readily accomplished. The crossed slots combined with the ZPO form the most basic definition of our Line of Sight (LOS) to the target.

It is important to note that the Layton teaching makes it possible to spatially encode a guidance beam cross section to develop a large plurality of resolution elements, with each resolution element being uniquely designated by a digital code effected by frequency or phase modulating the radiation in each resolution element according to a digital word.

Figure 10:
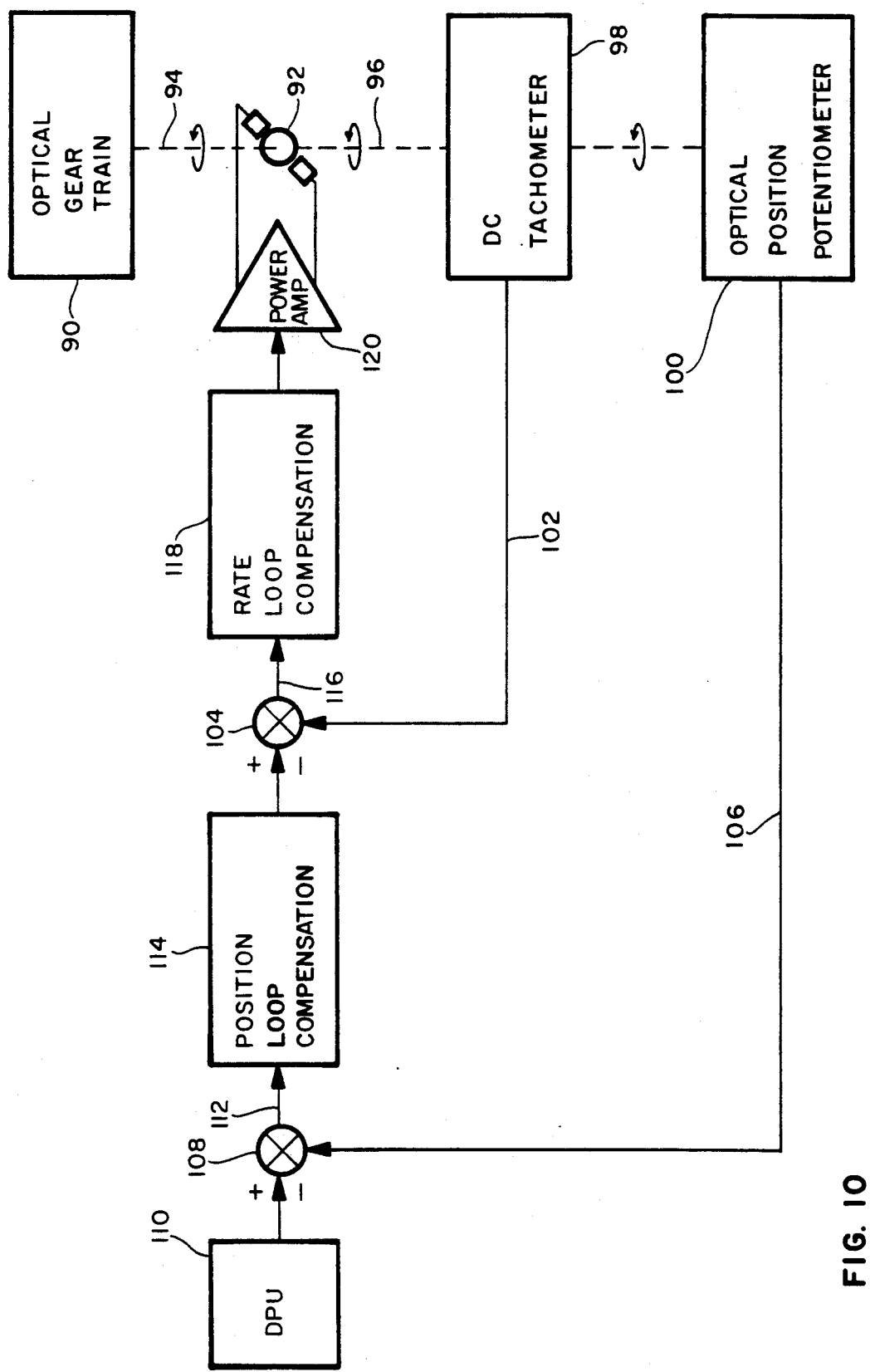
FIG. 10 is a block diagram of servo loops of the type that may be associated with the various zoom optic devices utilized in accordance with this invention.

Turning to FIG. 10, it will there be seen that we have provided a schematic showing of the servo loops preferably used for bringing about a proper zooming of each zoom optic we utilize. In this figure, the Optical Gear Train 90 may be regarded as representing the zoom components of the TMLO or ZPO, and a D.C. motor 92 is utilized which, by means of rotary shaft 94, brings about appropriate execution of desired commands By a rotary shaft 96, the motor 92 is also connected to a D.C. tachometer 98, and to an optical position potentiometer 100. The tachometer 98 produces a voltage proportional to the angular velocity of shaft 96, and by means of a lead 102, the output of the tachometer is connected to a velocity loop summing junction 104.

The optical position potentiometer 100 produces a voltage proportional to the position of shaft 96, and by a lead 106, it is connected to position loop summing junction 108.

Computer 110, also known as a Data Processing Unit ( DPU), synthesizes the required command voltage. The computer has a preprogrammed lookup table or algorithm which defines the required position of the optical rotary shaft 96 as a function of variables such as range, time, or the like. During flight of the missile, the computer 110 provides a command voltage to the position loop summing junction 108.

The summing junction 108 outputs an error voltage on lead 112 that is proportional to the difference in the command voltage from the computer 110, and the position feedback voltage from the optical position potentiometer 100. This error voltage is of such a phase that when amplified and delivered to the motor 92 via certain components now to be described, it will bring about appropriate zooming action of the optical components.

More particularly, the error voltage on lead 112 is amplified and phase compensated in Position Loop Compensation 114, and is then inputted to the velocity loop summing junction 104. This quantity is algebraically summed in the summing junction 104 with a velocity feedback voltage from D.C.tachometer 98, latter voltage being proportional to the rotational velocity of shaft 96 (and 94).

The error output of the rate loop summing junction 104 is connected by lead 116 to the Rate Loop Compensation 118 and thence to D.C. power amplifier 120, with the amplified output signal therefrom serving to drive the D.C. motor 92 in the appropriate direction and at a proper velocity to bring about a desired motion of the zoom elements.

As the optical shaft 94 approaches the desired position commanded by the computer 110, the velocity loop functions to cause an appropriate deceleration of the shaft and optical elements so as to avoid overshoot or oscillatory motion about the desired position. Eventually, the optical position potentiometer 100 provides a voltage equal and opposite to the voltage of the computer 110, at which time motion of the optical elements approaches zero.

As should now be apparent, the primary purpose of the outer or position loop is to position the optical elements as commanded by the computer 110, whereas the purpose of the inside or velocity loop is to provide velocity stabilization in order that accuracy and stability of shaft rotation may be achieved without the danger of overshoot.

Figure 11:
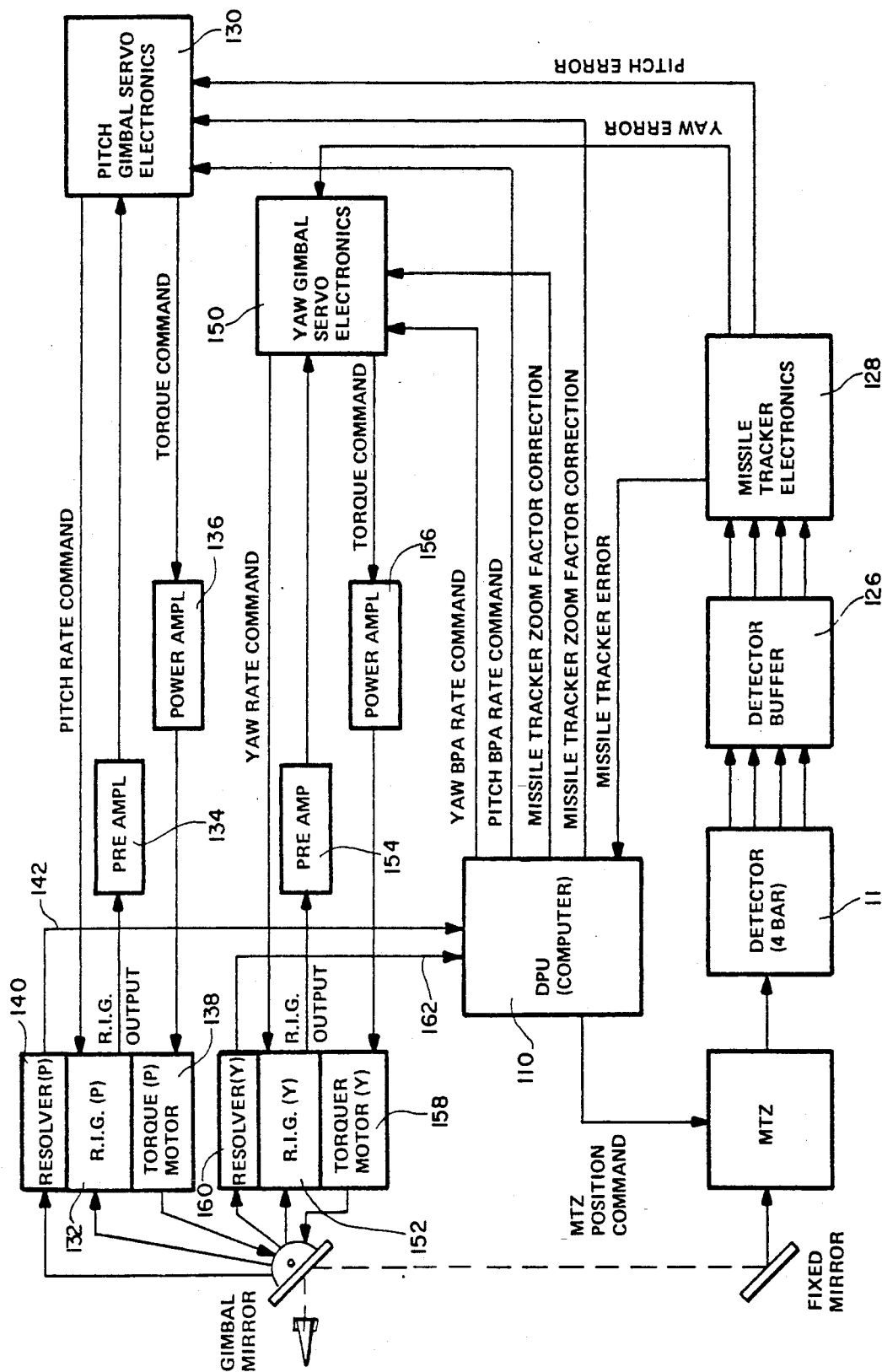
FIG. 11 is a block diagram of the components associated with the gimballed mirror that is kept in alignment with the missile by the MTZ.

In FIG. 11 we show in general detail, and with some degree of simplification, the servo arrangement responsible for the positioning of the gimballed mirror 9 such that it will continue to track the missile as it pursues the target, and so that appropriate guidance information can continue to be sent to the missile throughout its powered flight.

The arrangement we use is a line-of-sight stabilized servo, inertially stabilized by using rate integrating gyros.

As depicted in FIG. 11, the path by which irradiance from the missile rocket motor travels to the gimballed mirror 9 (illustrated in FIG. 12), thereafter to the fixed mirror, and then to the MTZ is indicated by a dashed line. As we have already explained in conjunction with FIG. 2, the beam of light energy from the missile engine passes along MTZ path D, passes through a rotating scanner 19, and then falls upon the four bar detector 11. The detector components are arranged in a circular array, and the spot of light representative of missile location is caused by the scanner to nutate with respect to the detectors, which are located every 90° about a circle. From a study of the output pulses from the detector, any misalignment of the mirror 9 can be determined, and the direction the mirror must be moved ascertained, in order that the image of the missile can be restored to the symmetrical relationship with respect to the four bars of the detector 11.

Outputs from the 4 bar detector pass to detector buffer 126, and thereafter to missile tracker electronics 128. The missile tracker error that is calculated is delivered to DPU 110, and yaw and pitch errors, which are positional errors, are delivered to pitch gimbal servo electronics 130, and to yaw gimbal servo electronics 150.

Before further describing the operation of the arrangement depicted in FIG. 11, it is first appropriate to define the principal loops involved. The rate loop for the pitch gimbal involves the sensor, which is the rate integrating gyro (RIG) 132, the output of which is to preamplifier 134, and thence to the pitch gimbal servo electronics 130. From latter, a torque command is delivered to power amplifier 136, and this device in turn is connected to the torque motor 138. Associated with the RIG 132 is pitch resolver 140. We prefer to use rate integrating gyros because they offer better signal-to-noise characteristics than rate gyros.

It is to be realized that the RIG 132 normally holds its inertial position, and if any outside disturbance attempts to move the mirror 9, then the gyro recognizes it, and generates the necessary torque command to restore the mirror to its prior position.

RIG pickoffs are amplified by Preamp 134, and then sent to the servo electronics unit 130. The signals are demodulated, filtered, and compensated; and then go to the torque amplifier 136. It in turn generates control signals to the DC torquer 138 that serves to move the mirror appropriately. The torquer is a multi-pole, limited angle D.C. torquer.

It may thus be said that the RIG provides the internal stabilization of the gimbal, for it measures inertial rates and stabilizes the gimbal. When the position of the mirror 9 is to be changed, this is accomplished by changing a reference of the RIG, by a current caused to flow through its torquer 138. This torques the reference of the gyro, and the gyro thereafter holds its inertial stabilization about the new reference. Thus, to change the line of sight, a rate command is issued to the gyro, which causes it to change its reference, and thus change the mirror position accordingly.

The yaw rate loop is closely relatable to the pitch rate loop, and bears similar reference numerals. No separate explanation of it is therefore believed necessary.

With regard to the pitch position loop, the pitch resolver 140 is connected by lead 142 to the DPU 110. The DPU is then able to generate and deliver appropriate error signals to the servo electronics unit 130, and the servo electronics unit then in turn issues the proper pitch rate commands to the gyro 132. These are called pitch rate commands because the current delivered to the pitch RIG torquer causes the RIG line-of-sight reference to change at a rate proportional to the current delivered to the RIG torquer.

Each position loop around the gimballed mirror has basically two modes. A first of these modes involves stabilizing the gimballed mirror with respect to its own mechanical reference. These mechanical references are measured by the pitch resolver 140 and the yaw resolver 160, and the information thus obtained is processed by means of a resolver-to-digital converter in the DPU 110. We prefer to use resolvers built by Clifton Precision, Litton Systems, Inc, Clifton Heights, Pa.

When operating in this first mode, the gimballed mirror 9 is told to turn to some particular angle, (say zero degrees), before the launch of the missile. Those angles read by the resolver-to-digital converter represent the present position of the mirror. The difference between the present and the commanded position is the Position Loop Error Signal.

The subtraction is made in the DPU, and the resulting error signal is digitally compensated and outputted to the servo electronics through a digital-to-analog converter. The servo electronics in turn issues the appropriate rate commands to the gyro.

The other mode of the position loops involves stabilizing the line of sight about the missile position. In other words, the sensors in the previous instance are the pitch and yaw resolvers, but in this second instance, the sensors are the missile tracker system, including the zoom optics, detector, processing electronics, missile tracker, and the servo electronics, with error signals.

When the missile tracker system is being used as a sensor, this requires an adjustment of the optical gain, so the computer must recognize this and reduce the electrical gain accordingly, so that total loop gain will remain a constant. It should be noted that the Missile Tracker Zoom Factor Corrections from the DPU 110 are directed to the pitch and yaw servo electronics, and these accomplish the adjusting of the gain of the position loops. These are a measure of the range of the missile, and the zoom factor. As previously mentioned, information must be provided to the servo electronics so that it can reduce the electrical gain to compensate for the increased optical gain.

Quite in contrast, the position loops that include the resolvers do not care about the zoom factor correction, because the resolver sensitivity gain is always the same, or in other words, it does not have anything to do with the optical path.

When the system is first powered up, the position loop is closed around the resolvers. The resolver information is transmitted back to the DPU, and the DPU then generates the appropriate error signals, which are then transmitted to the servo electronics. The servo electronics then generate the pitch and yaw rate commands, that bring about the new inertial position for the gyro, to null these resolvers. The error signals from the gyro pickoffs are then amplified, sent back to the servo electronics, which generate torque commands to the power amplifier. The torque amplifier then generates the appropriate torque currents to the torquer motor. These motors then move to eliminate the gyro pickoff errors. After the missile is launched, and it comes within the field of view of the missile tracker, information to the effect that good track has been obtained is generated from the missile tracker, and sent to the DPU 110. This computer then transmits that information over to the servo electronics, and enables the servo electronics to change its mode of controlling the gimballed mirror.

At this point, when good information is being obtained out of the missile tracker, such information is revealing where the missile is with respect to the present line of sight of the mirror. At this time, positional error signals are transmitted over to the servo electronics. The servo electronics then starts to process those error signals to drive the gimballed mirror to null these error signals, and as the missile is moving away from the launcher, the computer is now sending position commands to the MTZ, which is changing its focal length or zoom factor. That zoom factor is reported back to the servo electronics, which then adjusts the gain of the loop to correspond to the appropriate increasing in optical gain of the system, and it continues in that mode until the computer decides to change the mode of operation.

As earlier indicated, it was necessary to simplify FIG. 11 in order to eliminate needless complexity, but in the interests of completeness it should be mentioned that the line of sight is compensated for roll rate information. There is a roll rate gyro off the gimbals on the pitch and yaw stabilized platform, that feeds forward into the pitch and yaw servo, and adjusts the rate signals for roll rate motion. Rate aiding information is also fed forward. As the pitch and yaw stabilized platform moves, the gyros on that platform sense the motion of the platform, and that information is also fed forward to the servo electronics.

Additional details regarding FIGS. 10 through 12 are to be found in the copending patent application of Shaw, Glaser and Amon entitled "Optical Guidance System for Beamrider Missile", cited hereinbefore. The teachings of that patent application are incorporated by reference herein.

We claim:

1. An optical system utilized to provide guidance information in the form of a modulated beam for a beamrider missile during its rocket powered flight phase, said system comprising first and second optical subsystems arranged to function cooperatively in object space, utilizing coincident lines of sight, said first and second optical subsystems being utilized to provide guidance information to the missile when the exhaust plume from the rocket engine is relatively difficult to penetrate, said second optical subsystem, along the optical axis of which the modulated beam is directed, comprising a negative optical group and a positive optical group combined into a defocusable beam expander, said groups being initially defocussed, and said negative group being movable in a linear manner away from the positive group, toward the focussed position, so as to maintain a constant beam diameter at the missile, said beam containing guidance information available for directing the missile, said positive and negative groups being constructed to be individually free of spherical aberration, whereby the shape of the transmitted beam is not disturbed in any of the zoom positions.

2. The optical system as recited in claim 1 in which said modulated beam is from a $CO_2$ laser.

3. The optical system as recited in claim 1 in which a dichroic is utilized, which dichroic passes the modulated beam emanating from said second optical subsystem, but reflects energy from the motor nozzle of the missile along the optical axis of said first optical subsystem.

4. The optical system as recited in claim 1 in which a gimballed mirror positioned by information derived by the use of said first optical subsystem is utilized for directing the modulated beam toward the missile throughout its flight.

5. The optical system as recited in claim 1 in which information derived by said first optical subsystem is utilized in a closed loop servo system for positioning a mirror gimballed about two axes, such that it tracks the missile, said gimballed mirror having resolvers equipped with pickoffs, the information obtained from said resolver pickoffs being processed through computer means so as to evolve missile commands serving to bring the missile toward the target line of sight, such missile commands being sent to the missile by means of said second optical subsystem and said gimballed mirror.

6. The optical system as recited in claim 1 wherein said first optical subsystem comprises means for deriving positional information from the rocket exhaust, and utilizing said positional information for positioning a gimballed mirror, latter mirror serving to keep an image of the rocket engine exhaust centered such that guidance information can be accurately transmitted, by the use of said second optical subsystem, to a receiver on the rear of the missile.

7. The optical system as recited in claim 6 wherein the positional information serves to determine the type of guidance information transmitted to the missile, so as to guide it toward the target line of sight.

8. The optical system as recited in claim 1 in which said first and second optical subsystems are both contained in a common housing, and both utilize zoom type optics, and in which motor driven cams are utilized for achieving a proper zooming of said zoom type optics.

9. The optical system as recited in claim 8 in which the axes of said first and second optical subsystems are parallel.

10. An optical system for use in the guidance of a beamrider missile having a rocket motor, said system having first and second optical subsystems arranged to function cooperatively in object space, said first optical subsystem having an optical axis upon which are disposed an afocal zoom section, a rotatable optical device to nutate incoming irradiance from the motor plume of the missile, and a detector upon which the plume irradiance is focussed by an imager group, said detector being an intrinsic par t of a servo loop utilized for controlling the placement of a gimballed mirror common to both of said optical subsystems, said gimballed mirror functioning to reflect the input irradiance to said first optical subsystem as well as to reflect the output energy of said second optical subsystem, said second optical subsystem having a positive optical group and a negative optical group combined into a defocussable beam expander, along the axis of which groups a beam of collimated light containing guidance information can be directed, said groups being initially separated, means for causing said negative group to be movable in a linear manner away from the positive group so that divergence of the emergent beam can be controlled, the emergent beam containing guidance information available for directing the missile during its flight toward a selected target, said groups being constructed to be individually free of spherical aberration and coma, whereby the shape of the transmitted beam is not disturbed in any of the zoom positions, said servo loop functioning to keep said gimballed mirror continuously and accurately positioned such that the collimated beam containing guidance information directed along the optical axis of said second optical subsystem will reach a receiver disposed on the rear of the missile to be guided.

11. The optical system as recited in claim 10 in which said optical device is a scanning wedge.

12. The optical system as recited in claim 10 in which said optical device is a prism.

13. The optical system as recited in claim 10 in which said beam of collimated light is from a $CO_2$ laser.

14. The optical system as recited in claim 10 in which said first and second optical subsystems each utilize zoom type optics.

15. The optical system as recited in claim 14 in which said first and second optical subsystems are each contained in a common housing, and motor driven cams are utilized for achieving the desired zooming action.

* * * * *